United States Patent [19]

Nu

[11] Patent Number: 4,620,777
[45] Date of Patent: Nov. 4, 1986

[54] SIDEVIEW MIRROR WITH SPRING-LOADED WATER SHIELD FOR VEHICLE

[76] Inventor: Tsai Y. Nu, 1st Fl., No. 9, Alley 73, Lane 75, Sec. 4 Nan Chin E. Rd., Taipei, Taiwan

[21] Appl. No.: 718,456

[22] Filed: Apr. 1, 1985

[51] Int. Cl.4 ............................ G02B 5/10; G02B 7/18
[52] U.S. Cl. ................................... 350/582; 350/580; 350/279; 350/630
[58] Field of Search ............... 350/582, 587, 580, 581, 350/279, 278, 277, 630, 629, 429, 578

[56] References Cited

FOREIGN PATENT DOCUMENTS 863600 1/1953 Fed. Rep. of Germany ...... 350/582

Primary Examiner—Jon W. Henry
Attorney, Agent, or Firm—Bacon & Thomas

[57] ABSTRACT

The present invention relates to a sideview mirror and in particular to one comprising a stand adapted to be attached to one side of a vehicle, a frame rotatably mounted on the stand, a reflecting mirror for widening the driver's field of vision and a water shield slidably fitted in the frame for keeping the reflecting mirror away from rainwater.

1 Claim, 3 Drawing Figures

4,620,777

SIDEVIEW MIRROR WITH SPRING-LOADED WATER SHIELD FOR VEHICLE

BACKGROUND OF THE INVENTION

This invention relates to a sideview mirror of a vehicle and in particular to one which can widen the driver's field of vision and has a water shield for keeping the reflecting mirror away from rainwater.

The sideview mirror of a vehicle is designed to enable the driver to see what is behind him. However, conventional sideview mirrors cannot provide the driver with a wide field of vision. Further, the reflecting surface of the conventional sideview mirror will easily get wet in the rain.

It is, therefore, an object of the present invention to provide an improved sideview mirror which may obviate and mitigate the above-mentioned drawbacks.

SUMMARY

The present invention relates to a sideview mirror especially adapted for use with automobiles.

It is the primary object of the present invention to provide a sideview mirror which utilizes a specially curved reflecting mirror to widen the driver's field of vision.

It is another object of the present invention to provide a sideview mirror which has a water shield for keeping the reflecting mirror away from rainwater.

It is still another object of the present invention to provide a sideview mirror which is simple in construction.

It is a further object of the present invention to provide a sideview mirror which is easy to assemble.

It is still a further object of the present invention to provide a sideview mirror which is economical to produce.

Other objects and merits and a fuller understanding of the present invention will be obtained by those having ordinary skill in the art when the following detailed description of the best mode contemplated for practicing the invention has been read in conjunction with the accompanying drawings wherein like numerals refer to like or similar parts and in which:

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
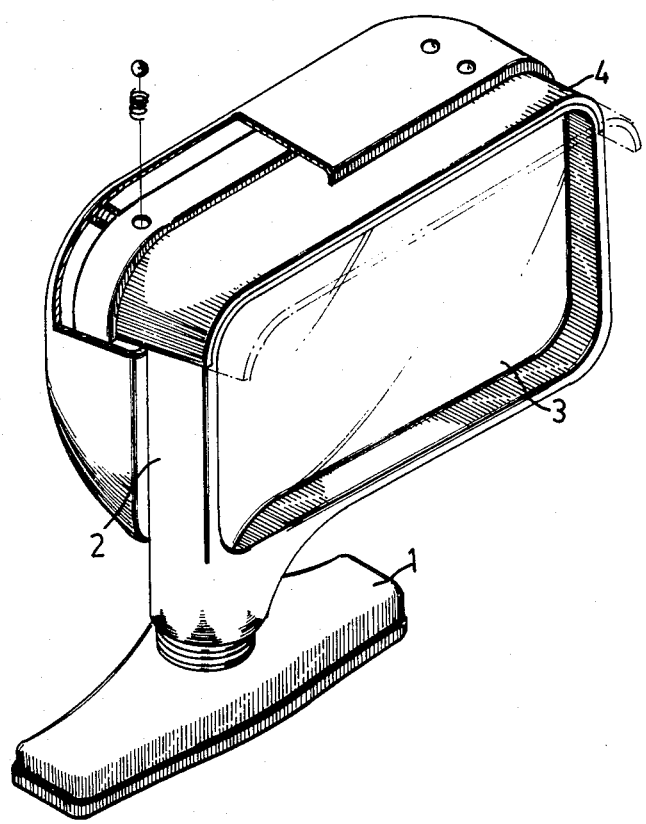
FIG. 1 is a perspective view of a sideview mirror according to the present invention with portions thereof shown in section.
Figure 2:
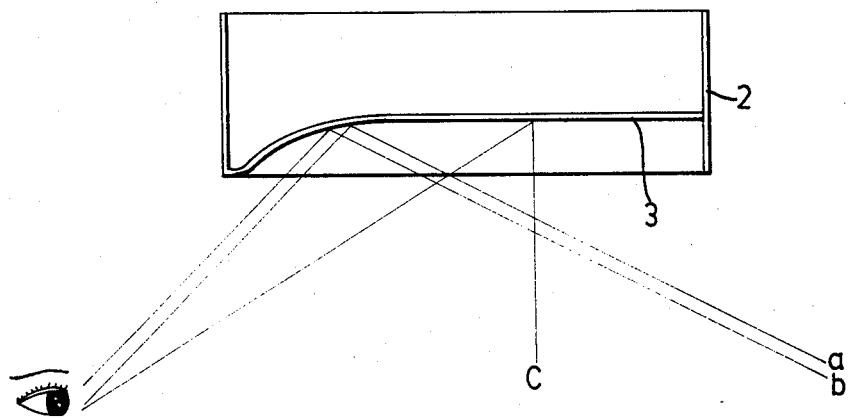
FIG. 2 shows why the sideview mirror can widen the driver's field of vision.

Referring to the drawings and in particular to FIG. 1 thereof, there is shown a sideview mirror according to the present invention. The sideview mirror comprises a stand 1 adapted to be attached to one side on a vehicle (not shown). Rotatably mounted on the stand 1 is a frame 2 in which is mounted a reflecting mirror 3 in known manner. As illustrated in FIG. 2, the reflecting mirror 3 is formed so that it first curves inwards in one-third of the surface thereof and then extends linearly in the remaining surface thereof, thereby not only enabling the driver to see the vehicle (not shown) behind him along line c but also the vehicle behind him along lines a and b. Accordingly, the driver's field of vision is much widened.

Figure 3:
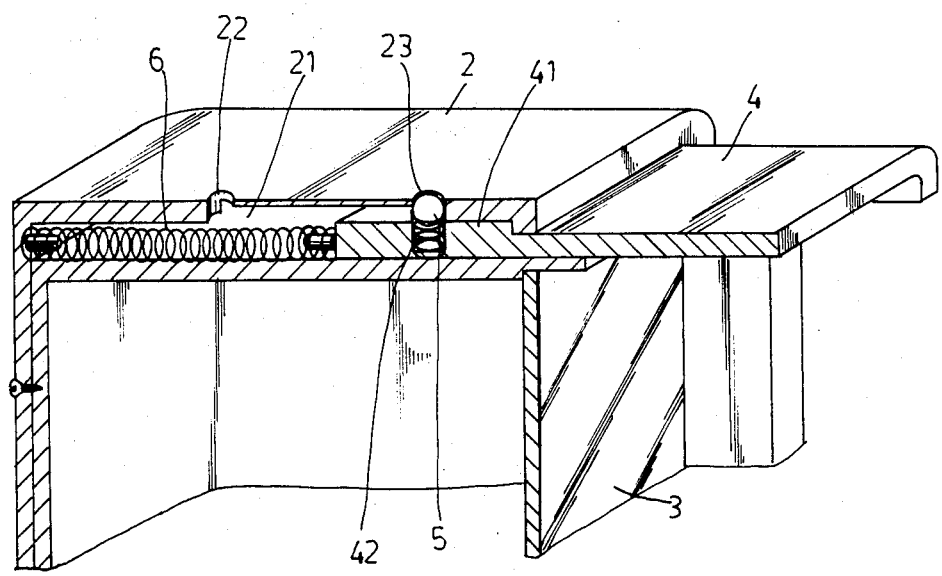
FIG. 3 is a fragmentary sectional view showing the interior of the sideview mirror.

With reference to FIGS. 1 and 3, a water shield 4 is provided in the frame 1 for keeping the reflecting mirror 3 away from rainwater. The water shield 4 is formed with a raised portion 41 slidably fitted in a slot 21 of the frame 2. The raised portion 41 has a hole 42 in which there is a spring-loaded ball 5. A spring 6 is disposed in the slot 21 to urge the water shield 4 to move outwards. The frame 2 is provided at the top with two holes 22 and 23 having a diameter slightly smaller than that of the hole 42 of the water shield 4. Consequently, when the hole 42 of the raised portion 41 of the water shield 4 is in alignment with the hole 22 or the hole 23 of the frame 2, part of the spring-loaded ball 5 will protrude from the hole 22 or 23 of the frame 2 thereby fixing the water shield 4 in position.

Referring to FIG. 3 again, the water shield 4 is shown in open condition. To close the water shield 4, it is only necessary to press the ball 5 and then push the water shield 4 into the frame 2 until the ball 5 is aligned with the hole 22 provided on the top of the frame 2. As the ball 5 and the hole 22 are in alignment, part of the ball 5 will move upwards thereby fixing the water shield 4 in closed position. When desired to open the water shield 4 to keep the reflecting mirror 3 away from rainwater, simply press the ball 5 into the hole 22 of the frame 2 so that the spring 6 will force the water shield 4 to move outwards.

Although this invention has been described with a certain degree of particularity, it is understood that the present disclosure is made by way of example only and that numerous changes in the detail of construction and the arrangement and combination of parts may be resorted to without departing from the spirit and scope of the invention as hereinafter claimed.

I claim:

1. A sideview mirror for a vehicle comprising:
   a stand adapted to be attached to one side of the vehicle;
   a frame rotatably mounted on said stand, said frame being formed on the top with two holes;
   a reflecting mirror mounted in said frame, said reflecting mirror being formed so that it first curves inwards in one-third of the surface thereof and then extends linearly in the remaining surface thereof; and
   a spring-loaded water shield having a raised portion slidably fitted in upper part of said frame, the raised portion of said water shield being formed with a hole in which there is a spring-loaded ball having a diameter larger than that of the hole of said frame, said ball being designed so that part of the ball will protrude from the hole of said frame when the hole of the raised portion of said water shield is aligned with the hole provided on the top of said frame thereby fixing said water shield in position.

* * * * *

UNITED STATES PATENT AND TRADEMARK OFFICE
CERTIFICATE OF CORRECTION

PATENT NO. : 4,620,777
DATED : November 4, 1986
INVENTOR(S) : Yueh Nu TSAI

It is certified that error appears in the above-identified patent and that said Letters Patent is hereby corrected as shown below:

On the face of the patent, the inventor's name should read as follows:

--Yueh Nu TSAI--

Signed and Sealed this

Third Day of February, 1987

*Attest:*

DONALD J. QUIGG

*Attesting Officer*  *Commissioner of Patents and Trademarks*